M. CLARK.
VEHICLE WHEEL TIRE.
APPLICATION FILED OCT. 4, 1913.
1,130,795.
Patented Mar. 9, 1915.
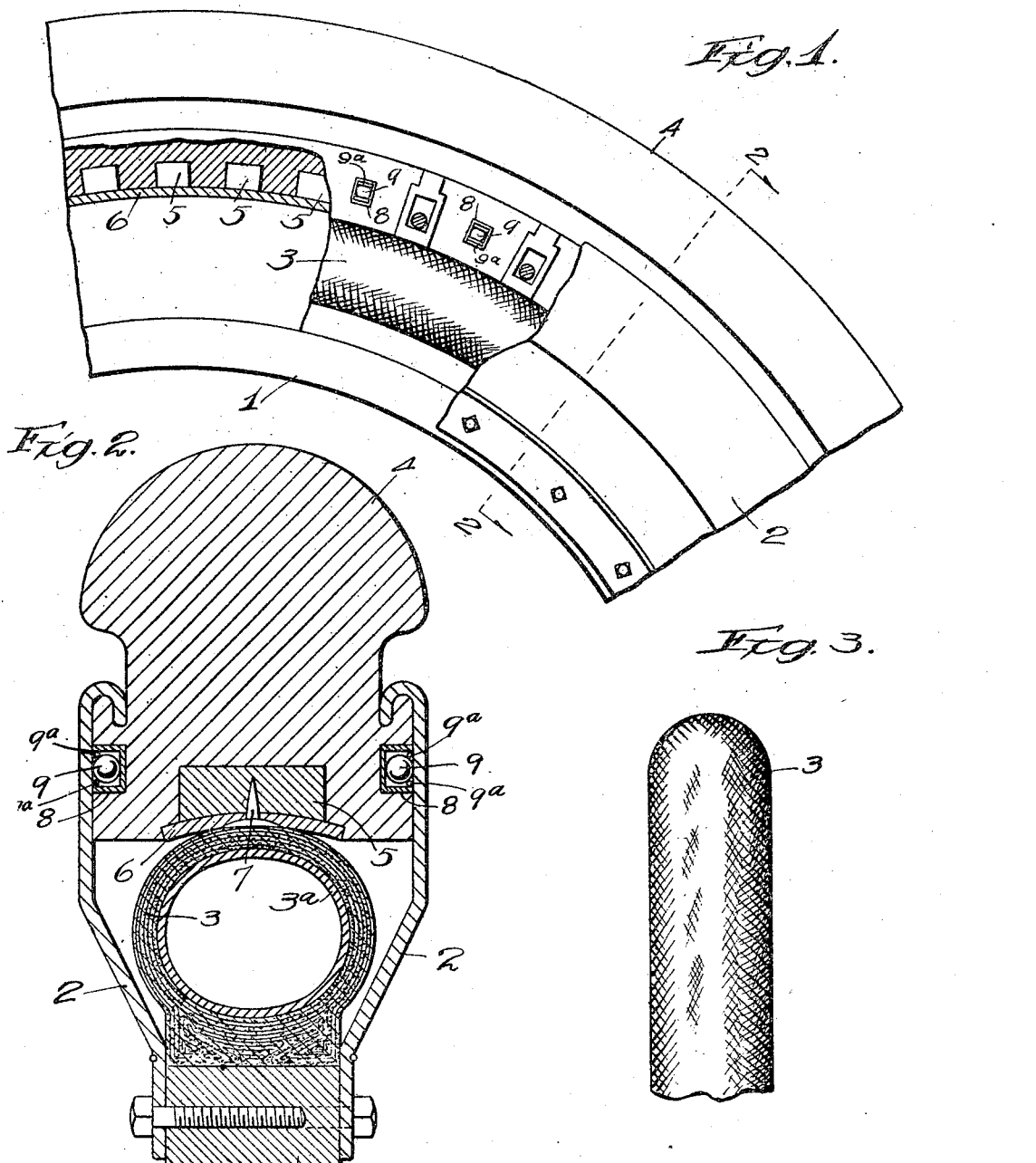

UNITED STATES PATENT OFFICE.

MELVILLE CLARK, OF CHICAGO, ILLINOIS.

VEHICLE WHEEL-TIRE.

1,130,795.  Specification of Letters Patent.  Patented Mar. 9, 1915.

Application filed October 4, 1913. Serial No. 793,272.

*To all whom it may concern:*

Be it known that I, MELVILLE CLARK, a citizen of the United States, residing at Chicago, in the county of Cook and State of Illinois, have invented new and useful Improvements in Vehicle Wheel - Tires, of which the following is a specification, reference being had to the accompanying drawings, forming a part thereof.

The purpose of this invention is to provide an improved construction of pneumatic vehicle wheel tire of the type which comprises a rubber or other elastic tread member, and a pneumatic tube on which the tread member is seated and which forms an air spring or air cushion for the same.

It consists in the elements and features of construction shown and described as indicated in the claim:

In the drawings: Figure 1 is a side elevation of a segment of a wheel equipped with a tire embodying this invention. Fig. 2 is a section at the line, 2—2, on Fig. 1 on an enlarged scale. Fig. 3 is an outer circumferential edge view of the air spring.

In the drawings the invention is shown applied to a vehicle wheel which in general construction follows familiar lines comprising a wooden felly, 1, on opposite sides of which there are bound metal guard plates, 2—2, between which the air spring, 3, and the rubber tread member, 4, are retained. The air spring is encompassed by an annulus, 6, made of leather belting with its ends lapped and joined up so as to make it endless without obvious seam, in a familiar manner. The inner side of the leather annulus is the smooth side of the belting, it being the "hair side" of the leather. This leather annulus is preferably let into the inner circumference of the tread member, 4, which is molded with a recess to accommodate it, and is reinforced and partly held in place by wooden blocks, 5, which are embedded in the tread member at its inner circumference at short intervals throughout that circumference, as seen in the drawings. The rough or grain side of the leather being next to the wooden blocks, the tendency of the leather to slip on the blocks is very slight, but in some cases it may be found desirable to secure the leather to the blocks by any convenient means, as, for example, by suitable broad round-headed tacks, 7, one of which is shown in Fig. 2, but this is not essential, and in many cases may be better dispensed with.

The air spring, 3, is made so as to be substantially unstretchable under inflation,— that is to say, it is strong enough to bear inflation to the necessary extent to adapt it to serve as the air spring and when thus inflated, does not reach the limits of the chamber in which it is inclosed, but merely seats at its inner circumference upon the transverse flanges of the side plates, 2, which extend over the periphery of the felly, and at its outer circumference, as indicated, it serves as a seat for the tread member whose inner circumferential facing, consisting of the leather annulus, makes the contact with the outer circumference of the air spring. For the purpose of obtaining the best results in respect to avoidance of heating and wear from friction between the leather annulus and the air spring, said air spring is made with the layer which forms its outer surface of fabric linen or cotton duck, or the like, which may be filled with any suitable substance to render it smooth, but without cutting it exteriorly. What is commonly called in the rubber industry "friction duck,"—that is, duck fabric which is partly saturated with a rubber gum, but without a coating of rubber,—is suitable for the purpose, but I do not limit myself to a fabric which is rubber filled. It is essential, however, for the best results, as above stated, that it should not be rubber coated, but should have the fabric fiber exposed so as to form the surface for contact with the leather belt. It will be understood, of course, that the air tube is interiorly provided with a layer, $3^a$, of rubber sufficiently thick to make it perfectly air tight.

In the drawings the air tube is shown of the special form which is desirable, but is not a part of the present invention, that is, having its inner circumference cylindrical about the axis of the wheel, or, as it appears in cross section, flat to form a broad foot for seating it outside the felly, this form being valuable as a means of preventing it from rocking laterally and so swinging its outer circumference over to one side, which might cause it to reach the edge of the leather and be scored thereby.

Another feature of this invention consists in the provision of anti-friction balls, 9, lodged in metal housings, 8, which are embedded in the sides of the tread member, 4, with the balls slightly protruding from the vertical planes of said sides so as to bear against the inner faces of the guard plates, 2, and save the tread member to some extent from the friction against the guard plates in the in-and-out movement of the tread member which results from the shifting of the load as the wheel rolls. The tread members may be formed with pockets in the sides to receive the housings, or the housings may be lodged in the mold so as to be embedded in the tread member in the forming and vulcanizing of the tire. On some accounts it is preferred to adopt the former course, that is, to make the housings so that after the tread member is completely molded, the housings may be lodged in the pockets formed in said tread member. This may be preferred because it affords opportunity for keying the ball in the housings by means of key-pins, 9ª, which are inserted and riveted in place after the balls are entered in the housings.

I claim:—

A vehicle wheel tire comprising, in combination an air spring or pneumatic tube whose outer surface at its outer circumference is formed of fibrous fabric; an endless leather belt encompassing the air spring and having its inner surface in contact with the latter, and an outer tread member of which the leather belt forms a facing at its inner circumference.

In testimony whereof, I have hereunto set my hand at Chicago, Illinois, this 10th day of September, 1913.

MELVILLE CLARK.

Witnesses:
M. GERTRUDE ADY,
LUCY I. STONE.